Figure 1:
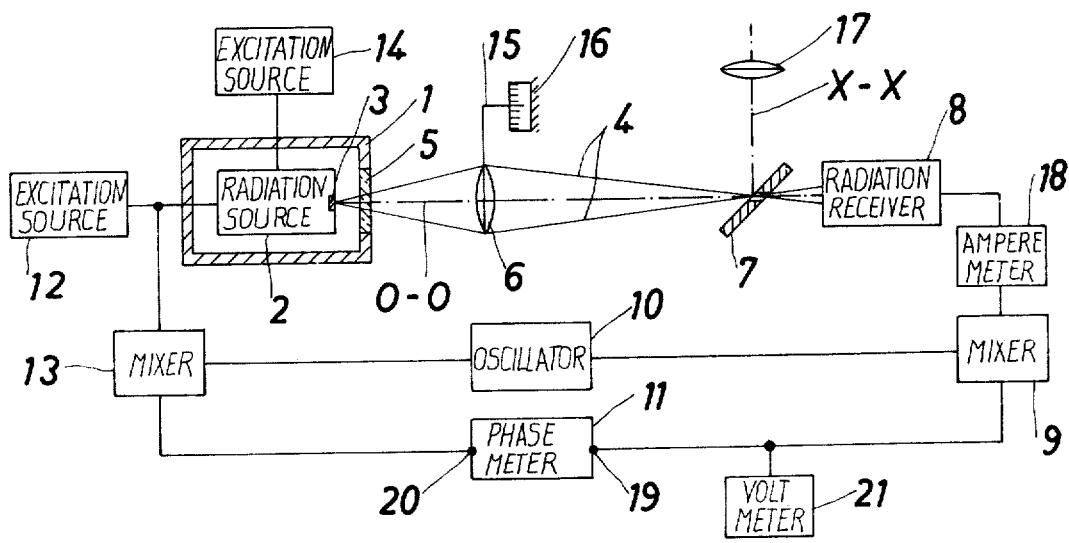

United States Patent [19]
Schubert et al.

[11] 3,886,370
[45] May 27, 1975

[54] DEVICE FOR MEASURING SEMICONDUCTOR RADIATION SOURCES

[76] Inventors: Walter Schubert, 36, Emil-Hollein-Strasse; Harry Wendt, 2, Strasse der Gargend, both of Jena; Reiner Doss, 2 F, Moldaustrasse, Teltow, all of Germany

[22] Filed: Nov. 21, 1973

[21] Appl. No.: 254,787

[52] U.S. Cl. ............ 250/552; 324/158 D; 250/206; 307/278
[51] Int. Cl. .......................................... H01j 39/12
[58] Field of Search ..... 250/552, 206, 214 R, 211 J; 324/158 D; 307/278

[56] References Cited
UNITED STATES PATENTS

| | | | |
|---|---|---|---|
| 3,290,504 | 12/1966 | Vallese et al. | 250/522 X |
| 3,293,438 | 12/1966 | Davis, Jr. | 250/552 X |
| 3,445,668 | 5/1969 | Armstrong | 250/552 |
| 3,728,025 | 4/1973 | Madigan et al. | 250/552 X |

OTHER PUBLICATIONS
Spitzer et al.: Journal of Applied Physics, Vol. 26, No. 4, 4/55, pp. 414–417.

Primary Examiner—Walter Stolwein

[57] ABSTRACT

In a measuring device, the determination of the local dependence of the intensity and/or the delay time of the recombination radiation on the radiation band of a semiconductor radiation source is reduced to phase measuring so as to enable as short delays at $10^{-11}$ seconds to be determined. The measuring device comprises an excitation source for a semiconductor radiation source, a magnifying optical system which images the semiconductor radiation source on a diaphragm having a radiation receiver in its rear. A phasemeter connected to the excitation receiver on the one hand and to the radiation receiver on the other, compares the phase of the excitation signal to the phase of the received signal. The image of the semiconductor radiation source is displaceable relatively to the diaphragm and can be viewed through an observation system.

8 Claims, 3 Drawing Figures

DEVICE FOR MEASURING SEMICONDUCTOR RADIATION SOURCES

The present invention is concerned with a device for measuring the local dependence of the intensity and the delay time of the recombination radiation on the radiation band of a semiconductor radiation source.

The local dependence of the intensity and/or the delay time of the recombination radiation cannot be measured by known means, because the delay times in the range of interest ($<10^{-11}$ seconds) are far too short. The known elements of electronic devices have too small an upper frequency limit for this purpose. Measurements at $10^{-11}$ seconds can therefore be made only at considerable technological expense and not without comparatively considerable errors. It has not been possible to identify differences in carrier lifetimes shorter than $10^{-10}$ seconds, as is necessary for finding inhomogeneities in optical semiconductor elements without damage to the latter. For example, staggerings in crystals and recombination centres cannot be defined in correlation with the absorption capacities of the semiconductive materials. Also it is not possible by known means to determine the local phase differences and frequency limits of a modulated signal emerging from the source of radiation. However, exact knowledge of such local parameters is indispensable, for example, to the accuracy of electro-optical distance-measuring instruments.

The present invention aims at obviating the disadvantages of the prior art by providing a device for measuring differences in the times of relaxation, preferably in synchronism with a determination of the intensity.

To this end, the present invention consists in a measuring device of the kind hereinbefore set forth, wherein a radiation receiver is succeeded by a phase meter; a magnifying optical system including a diaphragm and imaging the radiation surface of the semiconductor radiation source on the diaphragm is located between the semiconductor radiation source and the radiation receiver; an excitation source periodically excites the semiconductor radiation source; and mechanical-optical means produce measurable relative motion between the diaphragm and the image of the radiation source. The device according to the present invention permits magnification times smaller than $10^{-11}$ seconds to be exactly determined by a conversion of the time measurement to a phase measurement. It is possible, for example, to obtain information on delay times of $10^{-11}$ seconds even with a modulation frequency of 100 megacycles and a phase measuring accuracy of 0.3°. Thus, the device permits accurate measurement of inhomogeneities in semiconductor material and, moreover, of the time stability of the spontaneous recombination, as functions of the locus on laser diodes below the laser threshold.

Since phase measurement is technologically easier at low frequencies than at high, it is advisable to employ electric means permitting the use of the superheterodyne method, selective amplification being simplified by causing the conversion to take place in the receiver or directly to the rear thereof.

The comparison phase can be supplied to the phase meter via a system of receivers by either the excitation source or part of the radiation surface. The excitation source may be a periodically modulated radiation source emitting optical rays or an electron beam, or it may be a generator of electric oscillations which, in the semiconductor radiation source itself, inject carriers for the excitation of this source.

For exact setting to a definite section of the radiation source examined, it is advantageous that means for viewing the image of the radiation surface be placed in the plane of the diaphragm between the semiconductor radiation source and the receiver. Being contingent upon temperature, the optical dependence of the intensity and the delay time of the recombination radiation are determinated at several definite temperatures by means of a cryostat including the semiconductor radiation source.

To obviate the detrimental effect of high excitation intensities on the material of the semiconductor radiation source, it is advisable to equip the measuring device with electric means, for example an additional excitation source, for pulse-amplitude modulation. The local dependence of the intensity and the delay time of the recombination radiation can be determined in pulsed laser action only by an application of pulse-amplitude modulation.

Figure 2:
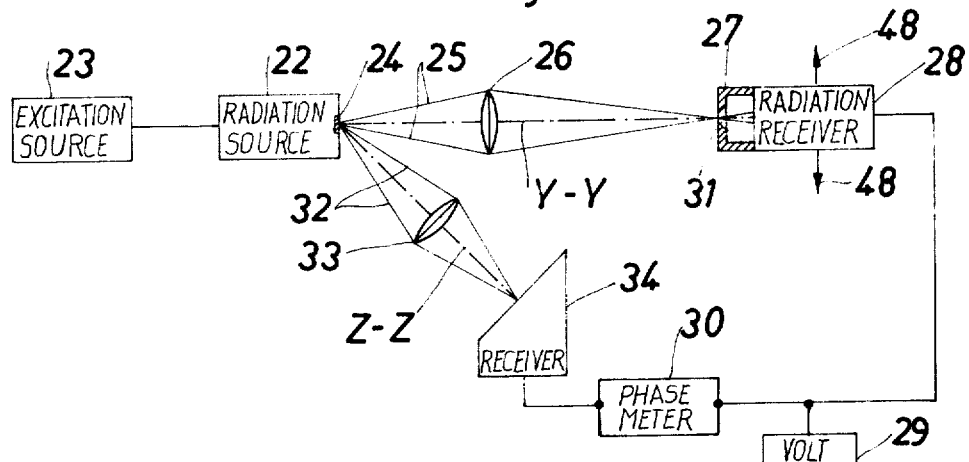
Figure 3:
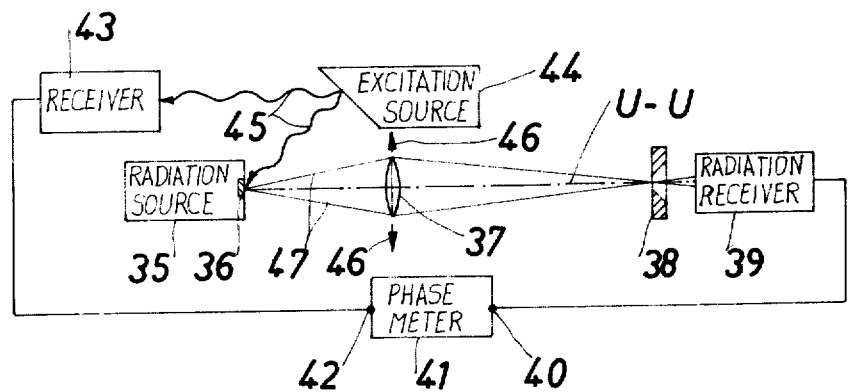

In order that the invention may be more readily understood, reference is made to the accompanying drawings, which illustrate diagrammatically and by way of example three embodiments thereof, and in which FIG. 1 is a first embodiment, having an electric excitation source, FIG. 2 shows a second embodiment, in which the reference phase is supplied by the radiation surface, and FIG. 3 shows a third embodiment, in which the excitation source is a periodically modulated radiation source.

In FIG. 1 of the drawings, a cryostat 1 includes a semiconductor radiation source 2 for examination. A radiation surface 3 of the source 2 emits radiation 4 and is imaged in the plane of a diaphragm 7 by way of a window 5 in the cryostat 1 and a magnifying optical system 6 having an optical axis 0 — 0. To the rear of the diaphragm 7 is a radiation receiver 8 by means of which the modulated radiation signal traversing the diaphragm 7 is converted into a high-frequency electric signal. From the receiver 8, the electric signal proceeds via an ampere meter 18 to a mixer 9 which by means of a signal from a super-heterodyne oscillator 10 transposes the high-frequency signal to low frequency. This low frequency signal arrives at an input 19 of a phase meter 11, wherein its phase is compared to that of a reference signal emitted by an electric excitation source 12 via a mixer 13 to an input 20 of the phase meter 11. The mixer 13 is connected to the super-heterodyne oscillator 10 in the same manner as is the mixer 9. The magnitude of the signal at the input 19 of the phasemeter 11 is measured by means of a voltmeter 21. The semiconductor radiation source 2 is excited by own carrier injection (p-n transition) through the medium of the excitation source 12. An excitation source 14 connected to the semiconductor radiation source 2 modulates the pulse amplitude.

The optical system 6 is measurably displaceable in two directions at right angles to one another, the displacement being substantially at right angles to the axis 0 — 0. Of the means for measuring displacement, those effective in the one direction (parallel to the drawing plane) are represented in the drawing by an index 15 and a scale 16. The index 15 is attached to the optical system 6, and the scale 16 is fast with the measuring device. The diaphragm 7 is inclined at 45° to the axis 0 — 0 and reflects part of the radiation 4 to a viewing system 17 having an optical axis X — X at right angles to the axis O — O.

The radiation surface 3 is scanned by displacing the optical system 6 at right angles to the axis O — O as well as parallel and at right angles to the plane of the drawing. Accordingly, the radiation receiver 8 receives radiation signals usually different in intensity and phase. The electric signal which emanates from the radiation receiver 8 as a beam comprising a direct-current component and an alternating-current component, is measured as to the intensity and the phase of the radiation 4 by the voltmeter 21 and the phase meter 11, respectively, and the ampere meter 18 indicates the time average (direct-current component) of the radiation 4 in the receiver 8. In the simplest case, the quotient of the peak value of the alternating-current component and the peak value of the direct-current component is used for finding the modulation factor of the semiconductor radiation source 2.

In the embodiment shown in FIG. 1, the semiconductor radiation source 2 or the diaphragm 7 may be displaceable, instead of the optical system 6, in two directions at right angles to one another and to the axis O — O.

In the embodiment shown in FIG. 2, a semiconductor radiation source 22 is electrically connected to an excitation source 23. A radiation surface 24 of the source 22 emits radiation 25, which is concentrated on a diaphragm 27 by means of an optical system 26 having an optical axis Y — Y. Part of the radiation 25 traverses an aperture 31 in the diaphragm 27 and strikes a radiation receiver 28, which is rigidly connected to the diaphragm 27. The radiation receiver 28, measurably displaceable in the directions of arrows 48, converts the modulated radiation signal into a corresponding electric signal the amplitude and phase of which are respectively measured by a voltmeter 29 and a phase meter 30. From the radiation surface 24, a part 32 of the emergent radiation travels via an optical system 33 having an optical axis Z — Z to a receiver 34, which converts the modulated radiation into an electric signal for transmission to the phase meter 30. This signal serves as reference phase for measuring the phase of the electric signal emanated by the radiation receiver 28. In all other respects, the operation is the same as that described with reference to FIG. 1.

The embodiment shown in FIG. 3 comprises a semiconductor radiation source 35, a radiation surface 36 thereof, an imaging optical system 37 having an optical axis U — U, a diaphragm 38, and a radiation receiver 39 electrically connected to an input 40 of a phase meter 41. An input 42 of the phase meter 41 is electrically connected to a receiver 43. An excitation source 44 emits modulated radiation 45 which, on the one hand, excites the semiconductor radiation source 35 to produce a modulated radiation 47 and, on the other hand, strikes the receiver 43 and is changed to an electric signal that serves as reference signal in the phase meter 41. Arrows 46 indicate the directions of displacement of the optical system. The displacement is similar to that described with reference to FIG. 1. The radiation 45 from the excitation source 44 is such as not to influence the radiation receiver 39. For example, there may exist a considerable difference in frequency between the radiation of the excitation source 44 and the radiation of the semiconductor radiation source 35, or the excitation source 44 may emit an electron beam. In these cases, the radiation receiver 39 has a narrow-band tuning with respect to the beams of the semiconductor radiation source 35. The operation of the embodiment shown in FIG. 3 is the same as that described with reference to FIGS. 1 and 2.

Further embodiments of the present invention are possible by exchanging elements of the foregoing three embodiments with each other and combining them in appropriate manner. For example, the cryostat 1 (FIG. 1) can be used in the embodiments illustrated in FIGS. 2 and 3. The same holds good for the frequency conversion method and the viewing system 17. The reference phase according to FIG. 2 can also be produced in the embodiment shown in FIG. 1. The excitation of the semiconductor radiation source 35 as illustrated in FIG. 3 will do service also in the embodiments of FIGS. 1 and 2.

We claim:

1. A device for measuring the local dependence of the intensity and the delay time of the recombination radiation on the radiation band of a semiconductor radiation source, comprising
    a semiconductor radiation source having a radiation surface,
    an excitation source for exciting periodic radiation of said semiconductor radiation source,
    a radiation receiver for receiving said radiation and transforming the periodic radiation signals into electric signals,
    a magnifying optical system,
    a diaphragm being radiation transmissive,
    said system and said diaphragm being located between said semiconductor radiation source and said radiation receiver,
    said system being traversed by said radiation, which images said radiation surface on said diaphragm and has a common optical axis with said radiation surface, said diaphragm and said radiation receiver,
    means for producing relative motion between the image of said radiation surface and said diaphragm,
    and a phasemeter connected to said radiation receiver and said excitation source for comparison of the phase of the signal in said radiation receiver and the phase of the excitation signal.

2. Device as claimed in claim 1, wherein frequency conversion means are connected with said radiation receiver and said phasemeter and with said excitation source and said phasemeter.

3. Device as claimed in claim 2, wherein said excitation source transmits a comparison phase to said phasemeter via said radiation source.

4. Device as claimed in claim 3, wherein said excitation source is a periodically modulated radiation source.

5. Device as claimed in claim 4, wherein said excitation source and said radiation source are integral with one another.

6. Device as claimed in claim 1, wherein an optical system for viewing the image of said radiation surface in the plane of said radiation transmissive diaphragm is located between said semiconductor radiation source and said radiation receiver, and wherein the optical axis of said magnifying optical system and the optical axis of said viewing system are substantially at right angles to one another.

7. Device as claimed in claim 1, wherein said semiconductor radiation source is enclosed by a cryostat.

8. Device as claimed in claim 1, having means for pulse amplitude modulation, said means being connected to said semiconductor radiation source.

* * * * *